Sept. 6, 1966  P. P. ROLLMAN  3,271,067
RETRACTABLE FOLDABLE RIGID ROOF FOR VEHICLE BODY
Filed Oct. 20, 1964  7 Sheets-Sheet 1

Sept. 6, 1966  P. P. ROLLMAN  3,271,067
RETRACTABLE FOLDABLE RIGID ROOF FOR VEHICLE BODY
Filed Oct. 20, 1964  7 Sheets-Sheet 3

Sept. 6, 1966 P. P. ROLLMAN 3,271,067
RETRACTABLE FOLDABLE RIGID ROOF FOR VEHICLE BODY
Filed Oct. 20, 1964 7 Sheets-Sheet 5

United States Patent Office 3,271,067
Patented Sept. 6, 1966

3,271,067
RETRACTABLE FOLDABLE RIGID ROOF FOR VEHICLE BODY
Paul Pierre Rollman, 1 Cite Beaumont, Fribourg, Switzerland
Filed Oct. 20, 1964, Ser. No. 405,106
Claims priority, application Switzerland, Nov. 18, 1963, 14,126/63
3 Claims. (Cl. 296—116)

This invention relates generally to vehicle bodies and has particular reference to a motor vehicle body having a retractable foldable rigid roof.

Most of the convertible motor vehicles have a foldable "soft top" of fabric. This soft top has to be withdrawn in an appropriate storage space usually at the rear of the back seat. Generally this soft top is is made out of a waterproof canvas and placed on a foldable structure of numerous and complicated pivoting struts, links, and rods. In use, the whole top is not trouble free, produces noises, is of poor water, thermic, and phonic insulation, furthermore the periodic replacement of the canvas is an expensive operation, and after all the inside and outside styling limits of the soft top as well as the visible mechanical means are not in relation to the usual luxurious appearance of convertible motor vehicles.

Some convertible motor vehicles are equipped with a removable so-called "hard top," made out of rigid material such as metal or reinforced polyester and which is put on the vehicle body during the cold season in order to give an improved waterproof and thermic insulation to the passengers. However, a removable hardtop is an expensive item, difficult to handle and encumbering to store.

Suggestions have already been made to palliate these disadvantages by equipping convertible motor vehicles with a rigid roof retractable rearwardly over or beneath the rear deck of the vehicle. Means, such as roof sliding rails or roof supporting links and struts, have been foreseen for the retractable operation. However, none of the suggested systems have been commercialised on a full scale. Most of the systems produce new disadvantages, such as limited space for luggage, limited styling both for the top and the luggage compartment, furthermore the retractable means of operation are complicated, encumbering, costly to manufacture and not completely trouble free. In short, the balance between the palliated disadvantages and the newly created disadvantages seems not to be in favor of the suggested systems.

An object of the present invention is to provide an improved retractable foldable rigid roof for convertible vehicle bodies offering a compact folded unit and allowing a combination of new facilities of simplified structure and mechanism and of less subjections.

A further object of the present invention is to provide a retractable foldable rigid roof which may be lowered and stored within the vehicle body behind the back of the rear seat.

A further object of the present invention is to provide a retractable foldable rigid roof which alternatively may be in raised position, thus composing a conventional sedan, or in folded but raised position, thus composing an opened sun roof sedan, or unfolded but lowered, thus composing a spider with tonneau cover.

A still further object of the present invention is not only to contemplate the body of the currently convertible cabriolet type of motor vehicle, but also to provide a retractable foldable rigid roof for the currently popular station wagon type of body.

The roof comprises a main rear roof section and a forward roof section interconnected to the main roof section with powered pivoting arms arranged therefor, so that the forward roof section is folded by swinging rearwardly upon the horizontal portion of the main roof section, thus providing a folded compact unit which by sliding down according to a vertical plane may be stored within the available space behind the back of the rear seat. When the roof is lowered, use of luggage compartment is still nearly full scale and its access as easy since the rear window of the roof is movable.

Other objects and advantages of this invention will be made more apparent as this description proceeds particularly when considered in connection with the accompanying drawings, given as example in order to illustrate the objects of the present invention.

Figure 1:
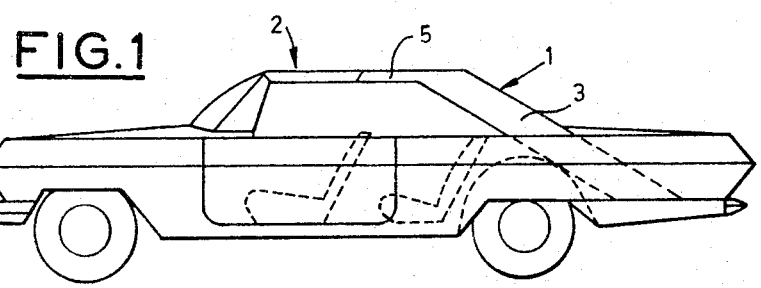
FIGURE 1 is a side view of a motor vehicle incorporating the present invention, with the roof in its raised position, thus providing a regular sedan.

Referring now to the drawings and particularly to FIGURES 1 to 4 inclusive, the motor vehicle body shown indicates generally a motor vehicle body incorporating the present invention. The body is somewhat similar to a conventional convertible in that the roof is foldable and retractable and is stored within the body, but being also similar to the so-called hardtop convertible in that the roof is of a rigid structure.

This roof is formed by two sections, 1 and 2, the main roof section 1 including two lateral panels 3 and 4 which are delimiting, with a horizontal panel 5 they are supporting, a rectangular opening 6, obturated by a windowpane 8 which is fixed to the posts by a frame 7. When the roof is entirely raised (FIG. 1) or raised but folded (FIG. 3), the panel 5 covers approximately the space between the front seat and the back of the rear seat. When the roof is retracted but unfolded (FIG. 2) the said panel 5 extends from the rear edge of the opening at the back of the rear seat and in line with the lid of the luggage compartment, the panels 3 and 4 being stored in the space at the back of the rear seat.

The said panels, being of a length adapted to the depth of the luggage compartment, are of such an inclination as to enable the panel 5, in a raised position, to realize the indicated function.

Figure 5:
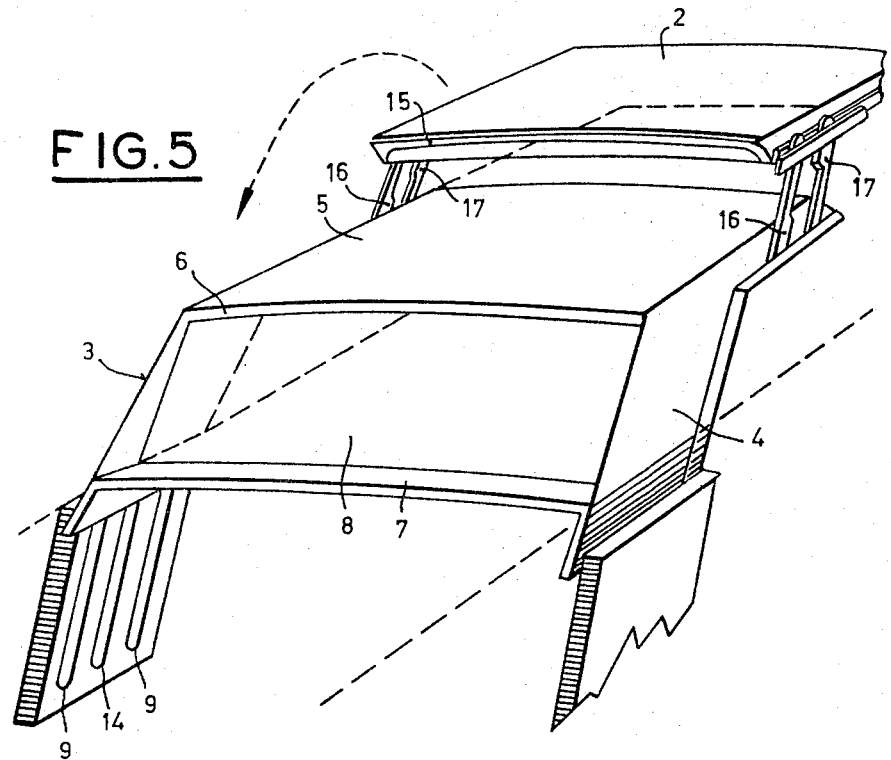
FIGURE 5 is a perspective view of the retractable foldable roof with the forward roof section partially folded and includes a diagrammatic perspective view of the proposed sliding mechanism.
Figure 6:
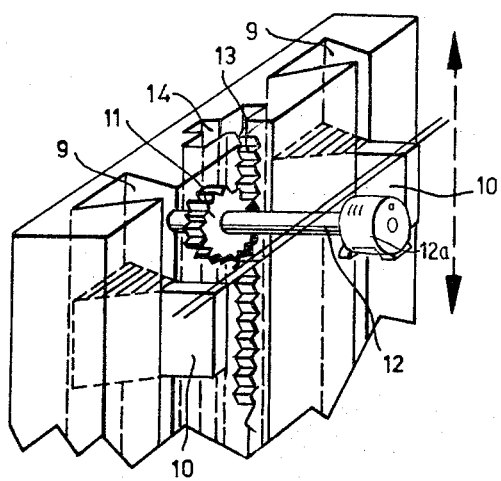
FIGURE 6 is an enlarged perspective view of the proposed sliding mechanism.

The vertical movement of the main roof section 1 is obtained by sliding of sliding members 10 connected to the panels 3 and 4 in pairs of guides or slides 9 connected to the lateral body structures of the luggage compartment (FIGS. 5 and 6). The vertical movement is achieved by a pinion 11 wedged on a driving shaft 12 which is mounted on the main roof section 1 and by a rack 13 secured to the vehicle body and located in a groove 14 which is disposed between and parallelly to the slides 9, and, also, in the luggage compartment.

Power actuation of the aforesaid shaft 12 should preferably be by an electric motor 12a. With the arrangement shown in FIGURE 6 for raising and lowering the lateral panels, this motor would be mounted on the lower portion of the lateral panel 3. It is evident that the electric motor could be replaced, for example, by an oleopneumatic one. In any case this motor would be controlled inside the vehicle.

The movement of the roof could also be actuated by manual means.

When the roof is entirely raised, section 2 covers that portion of the vehicle between the back of the front seat and the windshield. Section 2 conventionally is secured by its front edge to the top of the windshield by a waterproof junction. Externally, this forward roof section has a profile which is complementary to that of panel 5 of the main section 1, so that—in the position shown in FIGS. 1 or 2—section 2 and panel 5 of the main roof section 1 present a continual surface. On its back edge, as well as on its front edge, the section 2 includes a waterproof joint 15.

Moreover, the front edge of the panel 5 is cut in bevel according to a slope directed towards the front of the vehicle. The back edge of the section 2 is cut in a similar way which allows the section 2 to abut exactly against the panel 5. Besides, the length of the section 2 is nearly the same as that of panel 5.

Figure 7:
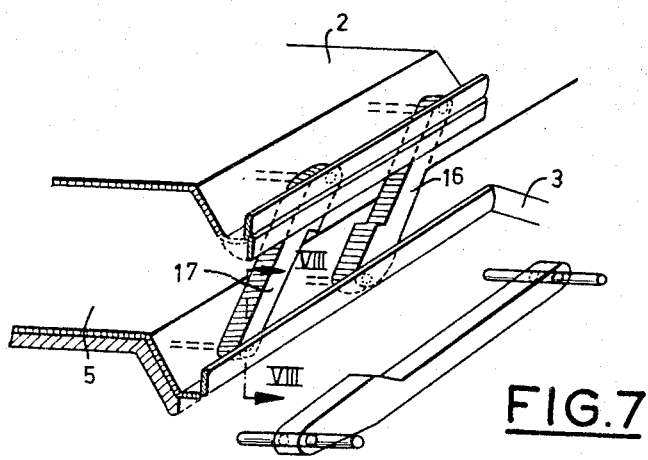
FIGURE 7 is an enlarged perspective view of the powered swinging arms.

The roof section 2 is connected to the main roof section 1 by means of two pairs of arms, 16 and 17, pivotally connected on the lateral sides of these sections (FIGS. 5 and 7). These arms are of the same length, and their pivoting axes are disposed according to a horizontal plane, identical for each section. As shown on FIGS. 5 and 7, the roof sections have on their lateral upper sides, wing shaped or rain gutter elements adapted to hide arms 16 and 17 when the roof is in the raised or lowered position.

Figure 8:
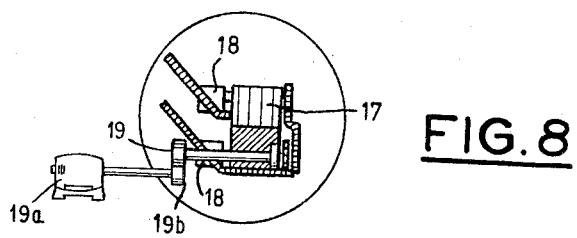
FIGURE 8 is an enlarged cross sectional view of the powered swinging arms axes.
Figure 9:
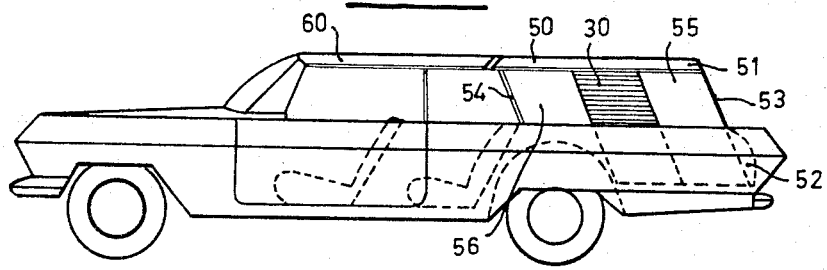
FIGURE 9 is a side view of a station wagon motor vehicle body incorporating the present invention, with the roof in its raised position, thus providing a regular station wagon.
Figure 10:
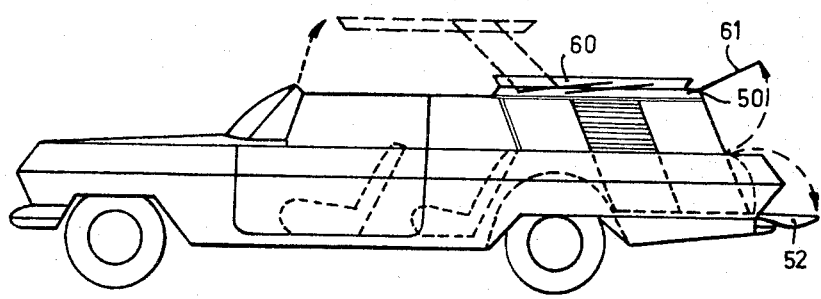
FIGURE 10 is a side view similar to FIGURE 9 but showing the roof in a raised but folded position, thus providing an opened sun roof station wagon.
Figure 12:
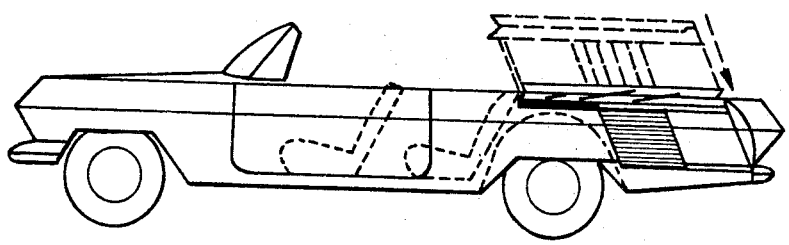
FIGURE 12 is a side view with the roof in its folded, retracted and stored position, thus providing a convertible.
Figure 9A:
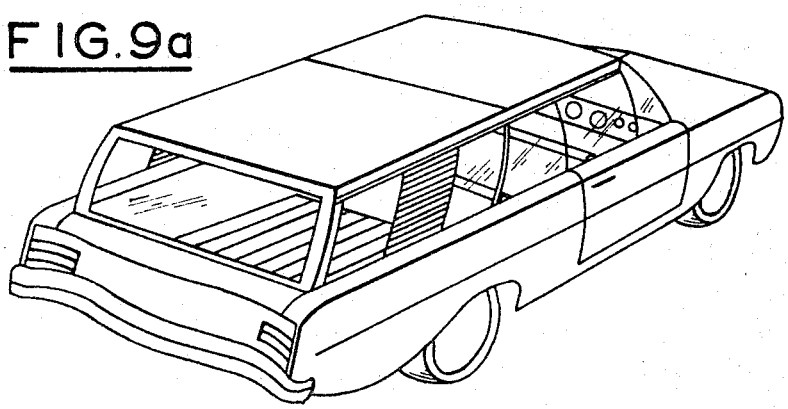
FIGURE 9a is a perspective view thereof.
Figure 10A:
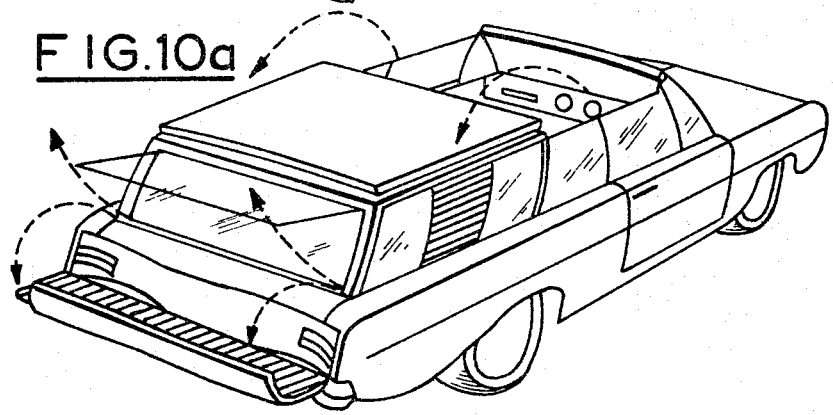
FIGURE 10a is a perspective view thereof.
Figure 12A:
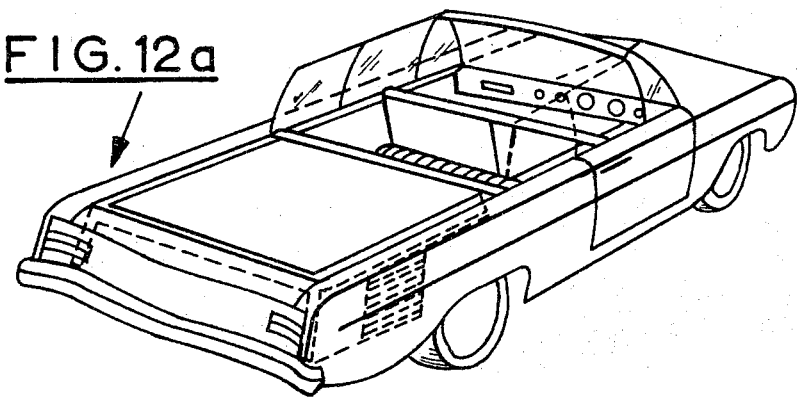
FIGURE 12a is a perspective view thereof.
Figure 13:
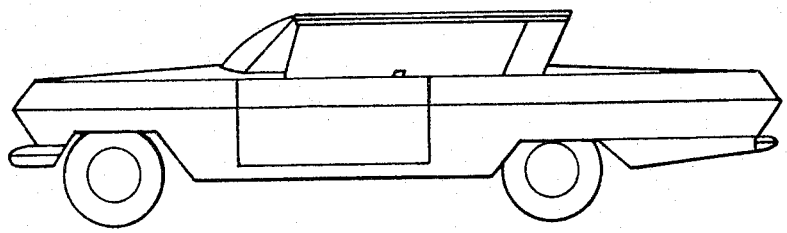
FIGURES 13 to 16 are series of side views of a motor vehicle body incorporating a variant presentation of the present invention.
Figure 14:
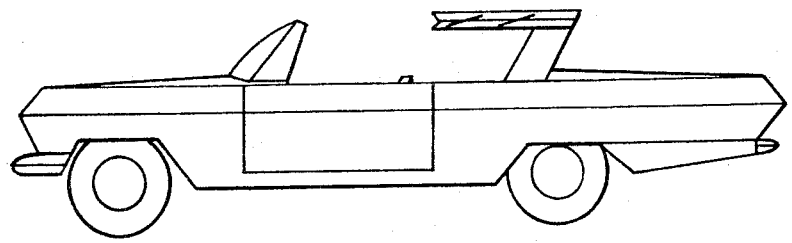

The pivoting axes on the main section 1 are powered. They are, in fact, interdependent on the arms 16 and 17 and cross a support 18 connected to section 1, as shown in the cross section, FIGURE 8. At the extreme end this axis bears a pinion 19 connected with an actuating motor 19a through a pinion 19b.

Figure 2:
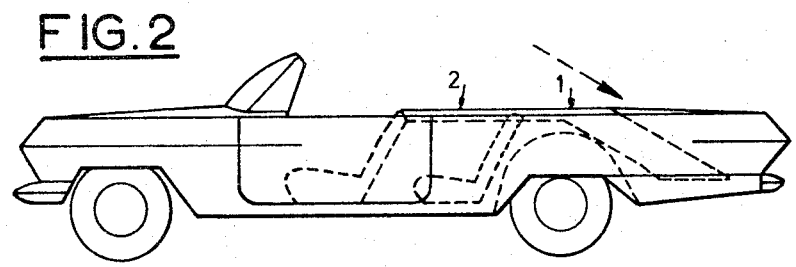
FIGURE 2 is a side view similar to FIGURE 1 but showing the roof in an unfolded but retracted position, thus providing a completely opened spider with tonneau cover.
Figure 3:
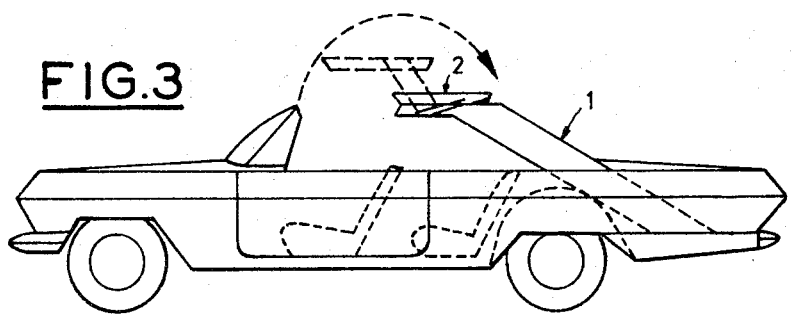
FIGURE 3 is a side view similar to FIGURE 1 but showing the roof in a raised but folded position, thus providing an opened sun roof sedan.

The length of the arms 16 and 17, as well as the location where they are fixed on the sections 1 and 2, are such as to make possible to place, by swinging back the forward section 2 on the panel 5 of the main section 1 (FIGS. 3 and 4), or, on the contrary, to carry the said section 2 exactly level and as an extension of the horizontal portion of the main roof section 1 (FIGS. 1 and 2). This powered swinging action is of course remote controlled inside the vehicle.

As described, the section 2 of the roof can be placed upon the panel 5 of the main section 1 (FIG. 3) with only the space above the front seat being open, thus giving a sun roof sedan.

It is also possible to retract without folding the roof. The posts of the main section 1 slide inside the luggage compartment of the vehicle, as shown by the dotted lines in FIG. 3. Section 2 fits between the back of the front seat and the back of the rear seat, thus giving an opened, so-called, "spider" with tonneau cover.

Figure 4:
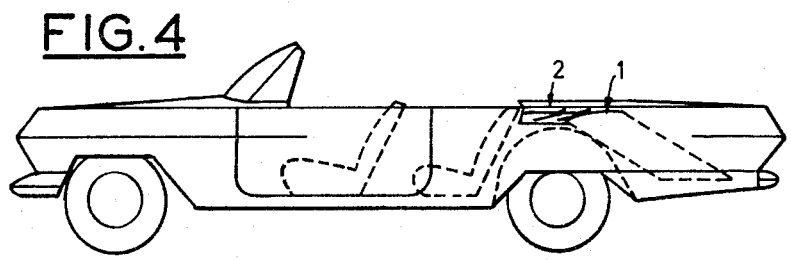
FIGURE 4 is a side view with the roof in its folded, retracted and stored position, thus providing a convertible.
Figure 1A:
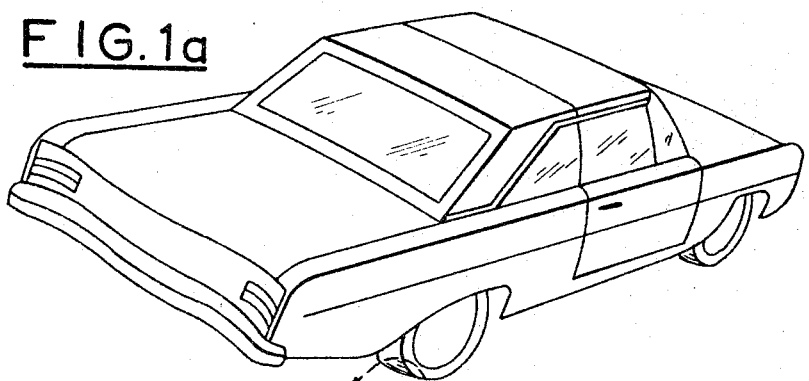
FIGURE 1a is a perspective view thereof.
Figure 3A:
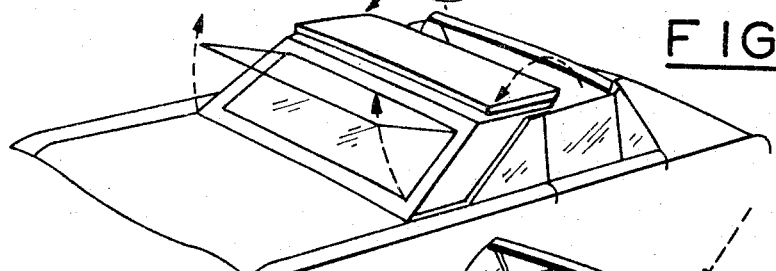
FIGURE 3a is a perspective view thereof.
Figure 2A:
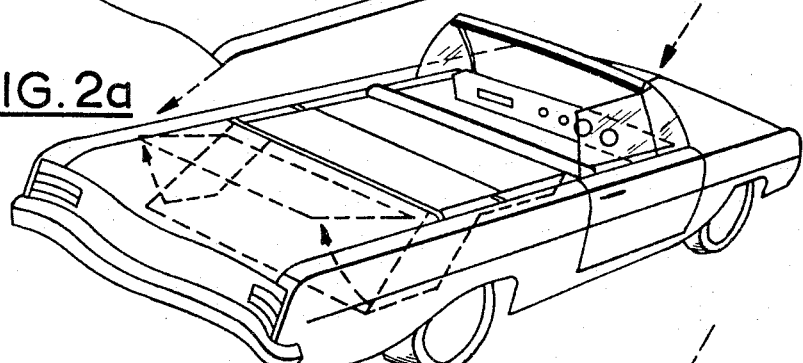
FIGURE 2a is a perspective view thereof.
Figure 4A:
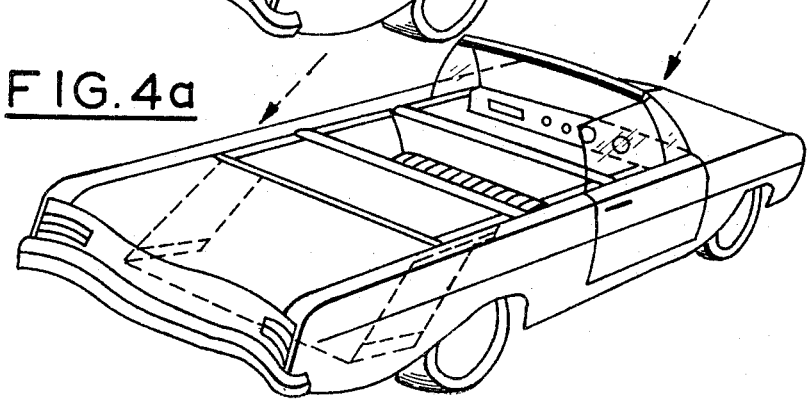
FIGURE 4a is a perspective view thereof.

Finally, when the roof is entirely retracted within the luggage compartment, as represented in FIG. 4, the result is a convertible.

The FIGURES 9 to 12 show a station wagon body incorporating the roof described previously.

In this case, the roof includes the lateral panels 30 which have the same functions and arrangements as the panels 3 and 4, indicated previously, and on the upper part of which is fixed a panel 50. The back end of the vehicle is a door composed of two movable parts (52 and 61). One part, the top 61, is a window which opens upwardly. The other part, the bottom 52, opens downwardly. When the roof is lowered the window, or top portion of the door, slides along the front of the bottom section of the door.

Figure 11:
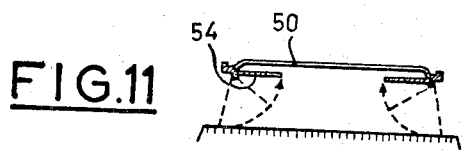
FIGURE 11 is a cross sectional view of the suggested station wagon, lateral walls partially retracted beneath the horizontal portion of the roof.

On both sides of the panels 30 are fixed two frames 53 and 54, the openings of which include window-panes 55 and 56, transparent or not. The frame 53 is connected on the panels 30, while frame 54 is connected to panel 50 by means of axes of articulation, allowing them to swing upwardly as shown in FIG. 11, or by sliding into pillar 30.

Besides, the front roof section 60 is pivoted to the main roof section 50 by means of pairs of pivoting arms which are identical to the arms 16 and 17 of FIG. 7. Means similar to the means described and illustrated previously are provided for pivoting the arms and to place, by swinging, the roof section 60 upon the main roof section 50.

FIGURES 9, 10, 11 and 12, show a variant of the invention permitting the transformation of a convertible (FIG. 12) into a station wagon. All elements of the roof can be retracted into the entire luggage compartment of the said convertible, for example, by means of a power cylinder as in U.S. Patent No. 3,021,174. The forward section 60 becomes the lid of the vehicle's luggage compartment. The raising of these elements, changing the vehicle into a station wagon, is accomplished in the way described previously, except for the frames 54.

The described roof can be adapted to any different realization than the indicated one, and can notably, more or less, be modified according to the requirements of the manufacturer. If for instance, a convertible should be covered in a way so that the rear window-pane presents an inclination of direction, similar to that of the windscreen, the supporting pillars could be inclined as shown in the variant presentation, illustrated in FIGS. 13 to 16 of the drawings, without loosing the advantages previously mentioned. In fact, the supporting panels could be slid into slides, as illustrated in FIG. 5.

It is also possible to proceed in a different way, notably by providing the said slides with a slope descending from back to front, as shown in FIGS. 13 through 16.

Thus, by lowering the panels behind the back seat, the motor vehicle would be transformed into a spider. The main roof section supported by these pillars, and the front section of the roof fits exactly between the front seat and the rear seat of the vehicle.

Figure 15:
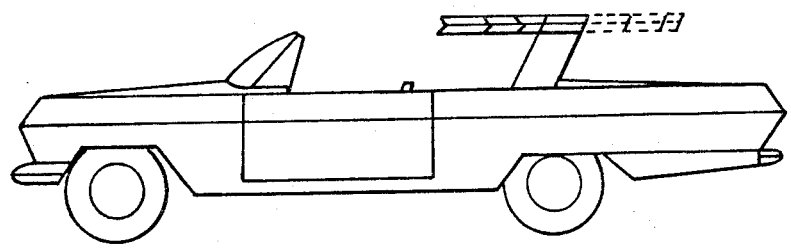
Figure 16:
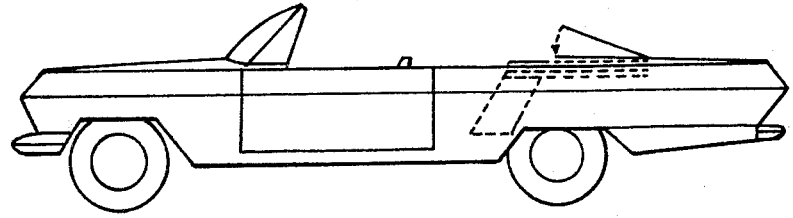

According to FIGS. 15 and 16, it is also possible to connect the horizontal roof panel to the panels, so as to enable it to slide in a horizontal direction. According to FIG. 15 the horizontal sections of the roof may be slid horizontally backwards, by means of cooperating slides and guides in order to clear the back seat. In a lowered position, shown in FIG. 16, the entire horizontal roof is in the luggage compartment and forms a convertible.

The roof described previously may be adapted to all types and styles of car bodies. It may be adapted to any kind of car, provided that the latter has been sufficiently reinforced, taking into account its possible use as a convertible.

In a general way, this roof unites the advantages of the sedan, especially as concerns rigidity, aerodynamism, as well as water, phonic and thermic insulation.

Besides, means for its operation are very simple and strong and lend themselves easily to manual control, as well as to automatic control. These means are not apparent, neither inside nor outside, in the terminal positions of the roof, so that general styling of the vehicle is not disturbed.

It will be apparent that the present invention is not limited to motor cars but also to vehicles such as busses, lorries, pleasure crafts or trailers. It will be understood that the invention is not limited to the exact construction shown and described, but that various changes and modifications may be made without departing from spirit and scope of the invention as defined in the appended claims.

I claim:

1. In a vehicle having a windshield, front and back seats and a storage space behind said back seats, a rigid, foldable, convertible roof comprising
   (A) a main rear roof section covering approximately the space between said front seats and the back of said rear seats;
   (B) lateral panels supporting said main roof section and extending downwardly from the main roof section;
   (C) a frame, supported by said panels and having a window;
   (D) sliding members secured to said panels;
   (E) guides in said storage space for receiving said sliding members, said guides lying in a vertical plane parallel to the forward direction of the vehicle, and being inclined downwardly and backwardly of the vehicle;
   (F) means for raising and retracting said sliding members in said guides and thereby raising and retracting said main roof section into said storage space;
   (G) a forward roof section having a front edge adapted to be secured to the top of said windshield, said forward section being pivotally secured to said main section by means of lateral arms so as to swing rearwardly to fit over said main roof portion and having means for pivoting said forward section to fold the same over said main section;
   (H) said roof extending substantially rearwardly from the rear edge of the back of said front seats when in the unfolded and retracted position so as to transform said vehicle into a vehicle of the "spider" type with tonneau cover; said roof extending substantially rearwardly from the back of said front seats when in the raised but folded position so as to transform said vehicle into a sun roof sedan; said roof fitting in said storage space when in its retracted and folded position so as to transform said vehicle into a convertible.

2. A roof as claimed in claim 1, wherein said roof sections have wing-shaped elements on their lateral upper sides adapted to hide said lateral arms.

3. In a station wagon vehicle having a front windshield across the body of said vehicle front and rear seats in said body, and a storage compartment disposed rearwardly of said seats, a rigid foldable roof comprising;
   (A) a main rear roof section covering substantially the space extending from the rear of said rear seats to and including said storage space;
   (B) lateral panels slidingly supporting said main roof section for retracting said roof and extending downwardly from the main roof section;
   (C) a window section pivotally mounted on the back end of said main roof section and adapted to swing upwardly;
   (D) window frames on both sides of said lateral panels, one of said frames being secured to its respective panel and the other pivotally connected to said main roof section and adapted to swing upwardly under said main roof section;
   (E) a front roof section pivotally secured to said main roof section so that it can pivot from a position in which a rear edge of the front roof section abuts against a front edge of the main roof section rearwardly onto said main roof section, said section being of a size such as to form the storage space lid when said roof is retracted;
   (F) means for pivoting said front roof section onto said main roof section;
   (G) means for raising and lowering said lateral panels so as to raise and lower said main roof section.

References Cited by the Examiner

UNITED STATES PATENTS

| 1,184,734 | 5/1916 | Freeman | 296—107 X |
| 2,492,842 | 12/1949 | Campbell | 108—145 X |
| 2,766,088 | 10/1956 | Jackson et al. | 108—138 X |
| 3,021,174 | 2/1962 | Rund | 296—117 X |

FOREIGN PATENTS

| 824,487 | 12/1959 | Great Britain. |
| 959,068 | 5/1964 | Great Britain. |
| 567,491 | 10/1957 | Italy. |

BENJAMIN HERSH, *Primary Examiner.*

C. C. PARSONS, *Assistant Examiner.*